(12) United States Patent
Lisewski et al.

(10) Patent No.: US 11,159,918 B2
(45) Date of Patent: Oct. 26, 2021

(54) SYSTEMS AND METHODS FOR MULTICASTING TO USER DEVICES

(71) Applicant: Verizon Patent and Licensing Inc., Arlington, VA (US)

(72) Inventors: Kevin Lisewski, Ramsey, NJ (US); Mansoor Ali Shah Mohammed, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/736,146

(22) Filed: Jan. 7, 2020

(65) Prior Publication Data

US 2021/0211846 A1 Jul. 8, 2021

(51) Int. Cl.
| | |
|---|---|
| *H04W 4/08* | (2009.01) |
| *H04W 4/021* | (2018.01) |
| *H04W 72/00* | (2009.01) |
| *H04W 72/12* | (2009.01) |
| *H04W 4/12* | (2009.01) |
| *H04W 84/18* | (2009.01) |

(52) U.S. Cl.
CPC ............ *H04W 4/08* (2013.01); *H04W 4/021* (2013.01); *H04W 4/12* (2013.01); *H04W 72/005* (2013.01); *H04W 72/1273* (2013.01); *H04W 84/18* (2013.01)

(58) Field of Classification Search
CPC ........... H04W 72/042; H04W 72/0446; H04W 68/02; H04W 4/06; H04W 60/04; H04W 52/0216; H04W 88/02; H04W 72/005; H04W 80/10; H04W 36/0007; H04W 68/005; H04W 72/0473; H04W 24/02; H04W 24/04; H04W 28/0221; H04W 36/0011; H04W 52/0212; H04W 52/0219; H04W 52/0251; H04W 72/1226; H04W 72/1273

See application file for complete search history.

(56) References Cited

U.S. PATENT DOCUMENTS

| | | | | |
|---|---|---|---|---|
| 2015/0156249 A1* | 6/2015 | Draznin | ................ | G06Q 30/02 709/204 |
| 2015/0223028 A1* | 8/2015 | Wang | ..................... | H04W 4/08 370/312 |
| 2015/0244611 A1* | 8/2015 | VanderZee | ......... | H04L 12/1886 370/338 |
| 2016/0205662 A1* | 7/2016 | Cormier | ............... | H04W 8/245 370/312 |
| 2018/0241617 A1* | 8/2018 | Radzikowski | ......... | G06F 8/656 |

* cited by examiner

*Primary Examiner* — Kwasi Karikari (57) ABSTRACT

A method may include receiving content for multicasting, identifying user equipment (UE) devices to receive the content and identifying a geographical or service area associated with the identified UE devices. The method may also include determining a scheduled time for a multicast transmission of the content and transmitting, prior to the scheduled time, a message to the devices, wherein the message indicates the scheduled time. The method may further include initiating the multicast transmission of the content at the scheduled time.

20 Claims, 8 Drawing Sheets

SYSTEMS AND METHODS FOR MULTICASTING TO USER DEVICES

BACKGROUND INFORMATION

Certain types of devices, such as Internet of Things (IoT) devices, are designed to be used with infrequent or no battery charging. Therefore, conserving battery life impacts nearly all decisions regarding operation and use of such devices. For example, to conserve the battery, IoT devices typically use low power processors and real time operating systems that can frequently stop and start. IoT devices also typically use special modems that use only a limited part of a wireless network radio frequency spectrum.

Despite these limitations, IoT devices have many of the same data intensive operational needs as more traditional user devices. For example, IoT devices may periodically require firmware updates to continue operating properly, as well as require new features to address bugs (e.g., software bugs).

In addition, IoT devices typically have limited power cycles. For example, typical IoT devices power on very infrequently to receive and process queued messages (e.g., once per day). Since many IoT devices may wake at different times during the day, updating such devices typically consumes a large amount of network resources and IoT resources (e.g., battery life).

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein include provisioning multicast services to end user devices that have limited power resources. For example, an entity associated with managing a large number of user devices, such as IoT devices, may provide content for the user devices (e.g., a firmware over the air (FOTA) update or a software over the air (SOTA) update) to a user device management platform, along with a time period/download schedule at which the entity managing the user devices would like to have the content broadcast to the user devices.

In one exemplary implementation, the user device management platform receives the information regarding the requested multicast and determines times when the targeted user devices are normally awake and not in a dormant or sleep mode in which messages cannot be received. The user device management platform may then transmit a "paging" type message to each of the targeted user devices at the time when the user devices are typically awake. The paging type message identifies a scheduled time/time period that the multicast is to occur and a wireless channel to which the user devices should tune to obtain the multicast content. The user devices receive the paging type message and manage/schedule their internal resources (e.g., a modem) to wake at the schedule time to tune to the multicast transmission, so that each user device is able to obtain the content (e.g., FOTA or SOTA update). In this manner, the user device management platform may provide targeted content to a large number of user devices at the same time, while minimizing resource usage at the user devices and data traffic in the network.

In addition, the user device management platform may include an application programming interface (API), such as a representational state transfer (REST) API to allow the device management platform to communicate with other devices/systems associated with broadcasting/multicasting content to user devices. In some implementations, software and/or middleware provided on the user device may orchestrate the user device's power management, including waking the necessary components (e.g., a modem) to receive multicast content at the appropriate time. Such software/middleware may be provided to the user devices via, for example, a software development kit, to allow the user devices to tune to the appropriate multicast channel at the appropriate time to obtain multicast transmissions while conserving battery resources.

Figure 1:
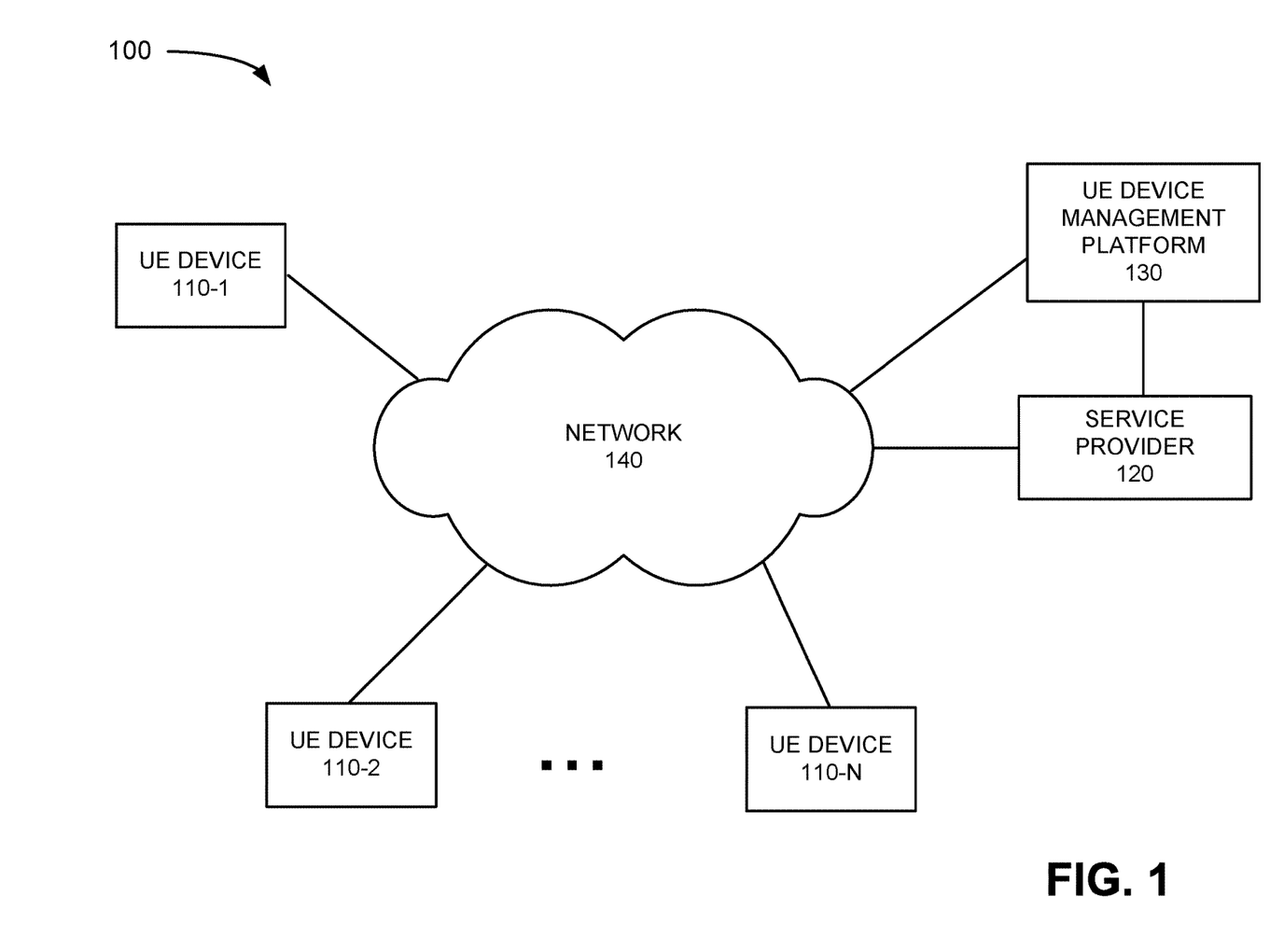
FIG. 1 illustrates an exemplary environment in which systems and methods described herein may be implemented.

FIG. 1 is a block diagram of an exemplary environment 100 in which systems and methods described herein may be implemented. Environment 100 may include user equipment (UE) devices 110-1 through 110-N, service provider 120, UE device management platform 130 and network 140.

UE devices 110-1 through 110-N are individually referred to as UE device 110 or 110-x, UE 110/110-x or user device 110/110-x and collectively as UE devices 110, UEs 110 or user devices 110. UE devices 110-1 through 110-N may include any device with communication functionality. For example, UE devices 110 may include machine-type communications (MTC) devices (e.g., category M (Cat-M) devices, such as LTE Cat-M1 or Cat-M2 devices), Internet of Things (IoT) devices (e.g., narrow band (NB) IoT devices, such as LTE Cat NB1 or Cat NB2 devices), machine-to-machine (M2M) devices, etc., that include communication functionality.

For example, UE devices 110 may include a utility meter (e.g., electricity meter, water meter, gas meter, etc.), an asset tracking device (e.g., a device, such as a camera, monitoring items in a retail location, a device monitoring the geographic location of a fleet of vehicles, etc.), a personal tracking device (e.g., a device monitoring the geographic location of people, etc.), a traffic management device (e.g., a traffic light, traffic camera, road sensor, road illumination light, etc.), a home appliance (e.g., a refrigerator), a home monitoring device (e.g., a security system), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), a health monitoring device (e.g., a blood pressure monitoring device, a heart rate monitoring system, a blood glucose monitoring device, etc.), and/or another type of electronic device with communication capabilities.

In other implementations, UE devices 110 may include a handheld wireless communication device (e.g., a mobile phone, a smart phone, a tablet device, etc.); a wearable computer device (e.g., a head-mounted display computer device, a head-mounted camera device, a wearable computer (e.g., a wristwatch, eyeglasses, etc.); a game playing device, a music playing device, a laptop computer, a tablet computer, or another type of portable computer; a personal/desktop computer; a notebook, a netbook, a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; and/or any other type of computer device with wireless communication capabilities.

UE devices 110 may connect to network 140 and other devices in environment 100 (e.g., service provider 120, UE device management platform 130, etc.) via any conventional technique, such as wired, wireless, optical connections or a combination of these techniques.

In an exemplary implementation, UE devices 110 may include software/firmware that enables UE device 110 to wake up and tune to a multicast channel to receive information of interest, such as firmware over the air (FOTA) updates, software over the air (SOTA) updates, etc. For example, UE device 110-1 may tune to a particular channel to obtain multicast transmissions directed to a class or group of UE devices 110, as described in detail below.

Service provider 120 may include one or more computer devices and systems associated with providing services via network 140. For example, in one implementation, service provider 120 may be an entity that provides wired, wireless and multimedia services, such as cellular telephone and data services, home telephone service, television service, etc. Service provider 120 may communicate with customers that manage UE devices 110 and subscribe to wireless services provided by service provider 120 (e.g., cellular data services). Service provider 120 may also communicate with UE device management platform 130 to facilitate multicast transmission for UE devices 110.

UE device management platform 130 may include one or more computing devices or systems that support UE device 110 management. For example, UE device management platform 130 may receive content for multicasting to a large number of UE devices 110 and determine an appropriate time to signal or page the targeted UE devices 110 with information regarding an upcoming multicast transmission. UE device management platform 130 may also include logic to provide a schedule for multicast transmissions and interface with a system that will broadcast content to the targeted UE devices 110, as described in detail below.

Network 140 may include one or more wired, wireless and/or optical networks that are capable of receiving and transmitting data, voice and/or video signals. For example, network 140 may include one or more public switched telephone networks (PSTNs) or other type of switched network. Network 140 may also include one or more wireless networks and may include a number of wireless stations for receiving wireless signals and forwarding the wireless signals toward the intended destinations. Network 140 may further include one or more satellite networks, one or more packet switched networks, such as an Internet protocol (IP) based network, a software defined network (SDN), a local area network (LAN), a personal area network (PAN), a WiFi network, a Bluetooth network, a wide area network (WAN), a long term evolution (LTE) network, a fourth generation (4G) network, a 4G LTE Advanced network, a fifth generation (5G) network, an intranet, the Internet, or another type of network that is capable of transmitting data. Network 140 may provide packet-switched services and wireless Internet protocol (IP) connectivity to UE devices 110 to provide, for example, data, voice, and/or multimedia services.

The exemplary configuration illustrated in FIG. 1 is provided for simplicity. It should be understood that a typical environment may include more or fewer devices than illustrated in FIG. 1. For example, environment 100 may include a large number (e.g., thousands or more) of UE devices 110 and multiple service providers 120 and UE device management platforms 130. As an example, environment 100 may include UE device management platforms 130 that are geographically distributed across a large service area (e.g., nationwide). Environment 100 (e.g., network 140) may also include other network elements, such as evolved NodeBs (eNodeBs), next generation NodeBs (gNodeBs), base stations, switches, gateways, routers, monitoring devices, etc. (not shown), that aid in routing data and providing multicast transmissions to UE devices 110.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
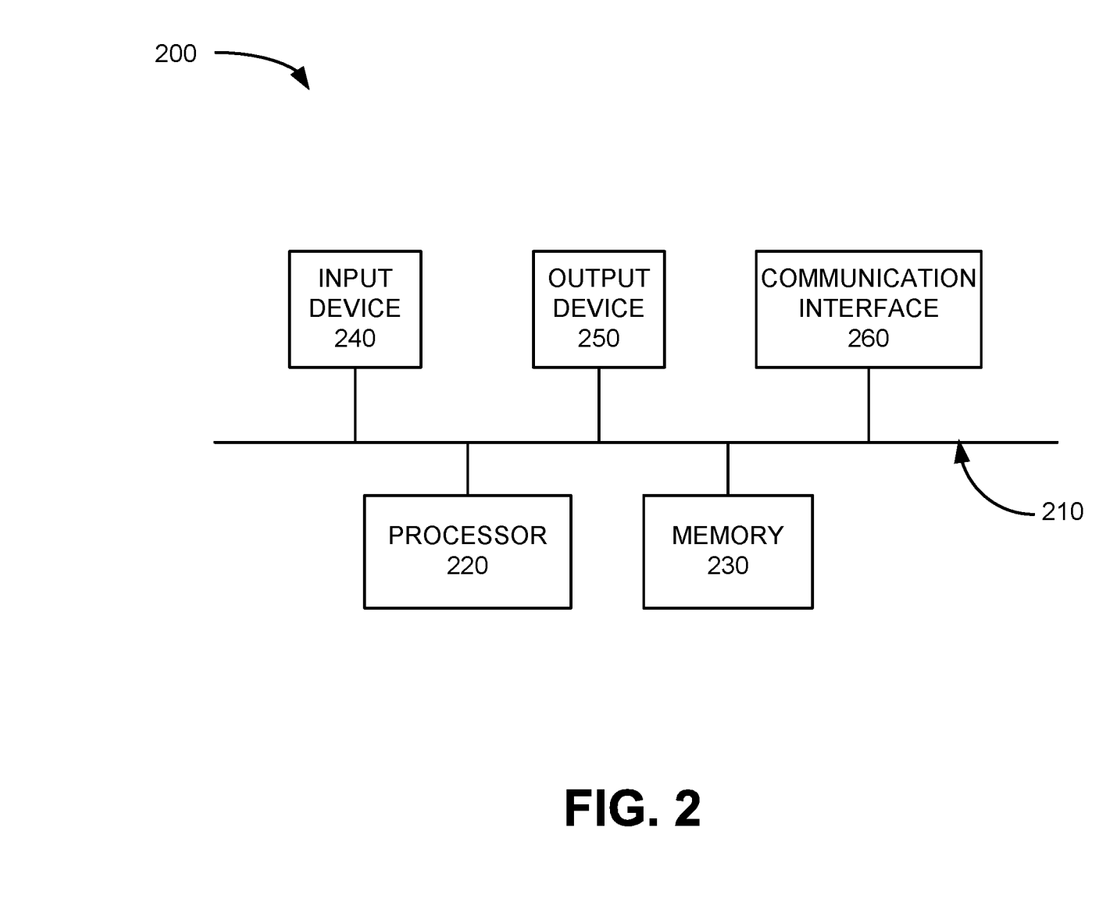
FIG. 2 illustrates an exemplary configuration of a device implemented in one or more of the components of FIG. 1.

FIG. 2 illustrates an exemplary configuration of a device 200. One or more devices 200 may correspond to or include elements implemented in UE device 110, service provider 120, UE device management platform 130 and/or network 140. Referring to FIG. 2, device 200 may include bus 210, processor 220, memory 230, input device 240, output device 250 and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD)), a printer, a speaker, etc. In some implementations, a touch screen display may act as both an input device and an output device.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data via network 140. Communication interface 260 may also include a modem or an Ethernet interface to a LAN or other mechanisms for communicating with elements in a network, such as network 140 or another network.

The exemplary configuration illustrated in FIG. 2 is provided for simplicity. It should be understood that device 200 may include more or fewer components than illustrated in FIG. 2. In an exemplary implementation, device 200 (or other device in environment 100) performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
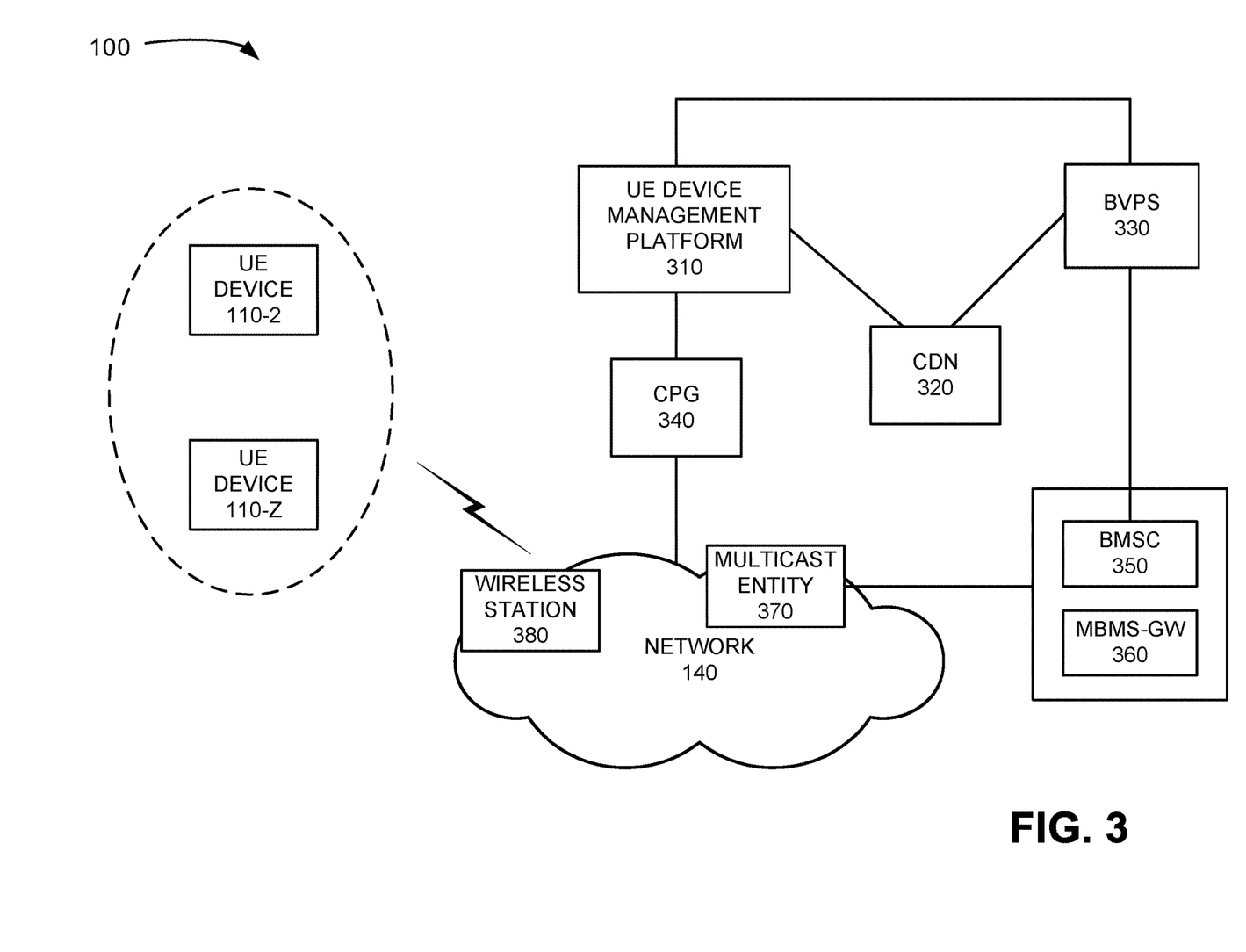
FIG. 3 illustrates components implemented in the environment of FIG. 1 in accordance with an exemplary implementation.

FIG. 3 is a block diagram illustrating exemplary components implemented in environment 100. Referring to FIG. 3, environment 100 may include UE device management platform 310, content distribution network (CDN) 320, broadcast video provisioning system (BVPS) 330, converged packet gateway (CPG) 340, broadcast multicast service center (BMSC) 350, multicast broadcast multicast services (MBMS) gateway (GW) 360, multicast entity (MCE) 370, wireless station 380 and UE devices 110-2 and 110-Z. In an exemplary implementation, all or some of the components illustrated in FIG. 3 may be implemented by processor 220 executing software instructions stored in memory 230.

UE device management platform 310 may correspond to UE device management platform 130 illustrated in FIG. 1 and may include one or more computing devices or systems to manage the transmission of messages to/from UE devices 110. For example, UE device management platform 310 may provide an interface for subscribers of service provider 120, such as original equipment manufacturers (OEMs) and other entities associated with providing and/or managing the operation of UE devices 110. For example, UE device management platform 310 may allow an entity associated with managing UE devices 110 (e.g., smart parking meters, smart traffic lights, asset tracking devices (e.g., cameras), home appliances, automotive vehicles (e.g., traffic and/or mapping applications executed by the vehicle), smart homes, etc., to provide an FOTA or SOTA update file, provide a patch to fix a software bug, etc.

CDN 320, BVPS 330 and CPG 340 may communicate with UE device management platform 310 to facilitate the efficient multicasting of information to UE devices 110. CDN 320 may include one or more computer devices that receive and/or distribute multicast content for particular UE devices 110. For example, CDN 320 may receive content that is to be multicast to UE devices 110. CDN 320 may forward the content to other devices in environment 100 prior to the broadcast, such as BVPS 330, as described in more detail below.

BVPS 330 may include one or more computing devices to facilitate multicast transmissions to UE devices 110. In one implementation, BVPS 330 may communicate with UE device management platform 310 over one or more application programming interfaces (APIs), such as a representational state transfer (REST) API. The APIs may allow UE device management platform 310 to interface with and/or query BVPS 330 and schedule multicast sessions in particular areas. BVPS 330 may also prepare the multicast content and file download parameters prior to the time when the multicast content is to be broadcast. That is, BVPS 330 may download any needed content prior to the time when the content will be broadcast and prepare the content for broadcast.

CPG 340 may include one or more network devices, such as a router, a gateway, a switch that processes and transfers data (e.g., data packets) in environment 100. In one implementation, CPG 340 may implement the functions of a serving gateway (SGW) and a packet data network gateway (PGW) in environment 100 for forwarding data via network 140. In accordance with implementations in which network 140 is a 5G network as opposed to, for example, a 4G LTE network, network 140 may include a user plane function (UPF) to route/forward packets, instead of CPG 340.

BMSC 340 may receive content from CDN 320 and/or BVPS 330 and cache the content for later delivery. BMSC 340 may also encode the file for transmission. In an exemplary implementation, the multicast content may be an FOTA or SOTA update for UE devices 110. MBMS-GW 350 may receive the encoded content from BMSC 340 and forward the content toward its intended destination. For example, BMSC-GW 350 may forward content (e.g., a multicast transmission) intended for UE devices 110-2 and 110-Z (shown in the dotted oval in FIG. 3) to MCE 370 for transmission to wireless station 380 associated with the multicast service area located closest to UE devices 110-2 and 110-Z.

MCE 370 may include one or more network devices configured to forward multicast data via network 140, such as via wireless stations 380. For example, MCE 370 may forward multicast content received from BVPS 330 via BMSC 350 and/or MBMS-GW 360 to appropriate wireless stations 380 corresponding to a service area identifier (SAID) for the multicast.

Wireless station 380 may correspond to a base station, such as an eNodeB, a gNodeB, etc., that communicates wirelessly with UE devices 110 located within radio frequency (RF) range of UE devices 110, such as UE devices 110-2 and 110-Z.

Although FIG. 3 shows exemplary components of environment 100, in other implementations, environment 100 may include fewer components, different components, differently arranged components, or additional components than depicted in FIG. 3. For example, environment 100 may include thousands or more UE devices 110 that are to receive multicast content. In addition, functions described as being performed by one of the components in FIG. 3 may alternatively be performed by another one or more of the components of environment 100.

Figure 4:
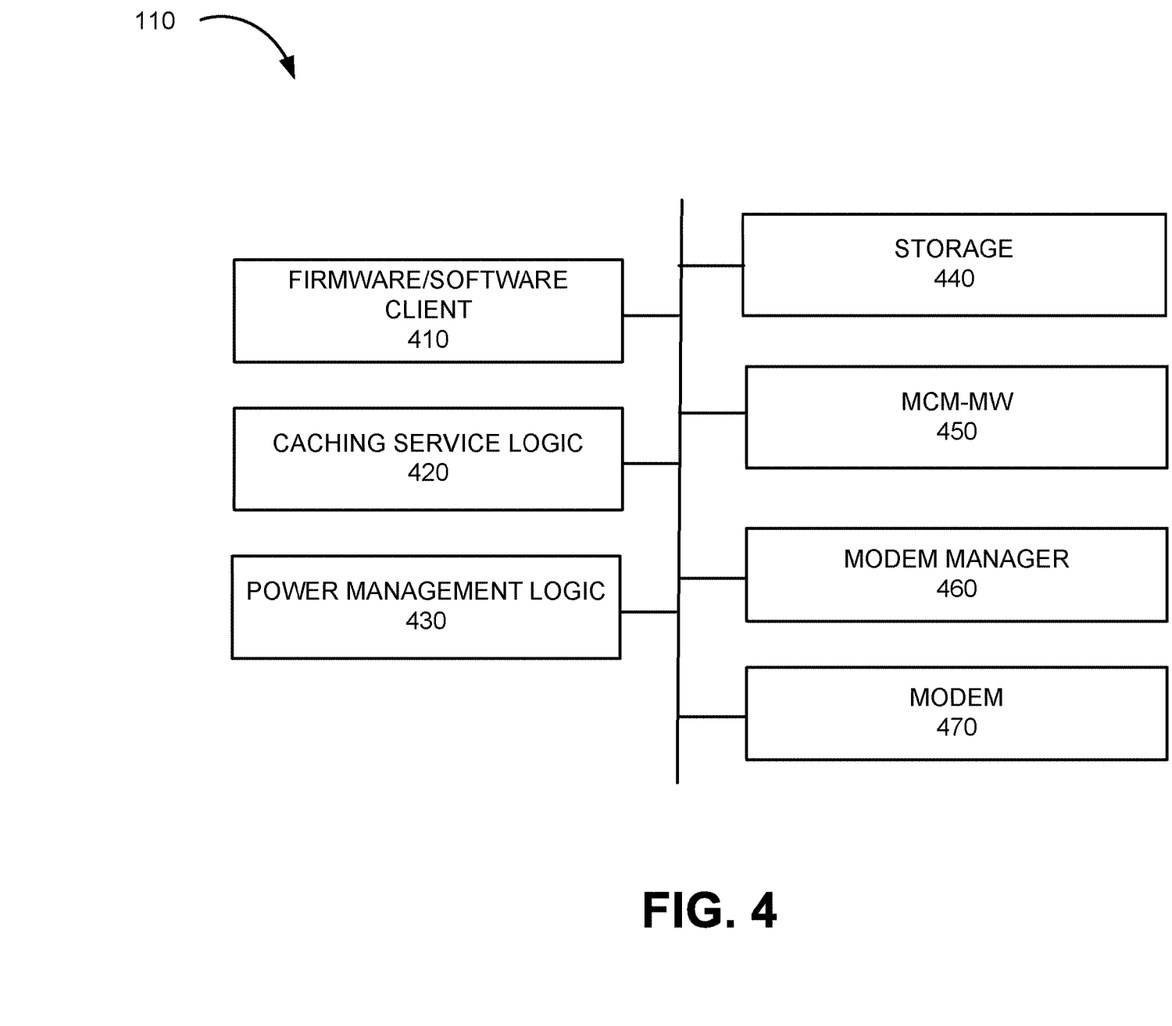
FIG. 4 illustrates an exemplary configuration of logic components included in the user equipment devices of FIG. 1.

FIG. 4 illustrates components implemented in UE device 110 in accordance with an exemplary implementation. Referring to FIG. 4, UE device 110 includes firmware/software client 410, caching service logic 420, power management logic 430, storage 440, mobile connected media middleware (MCM-MW) 450, modem manager 460 and modem 470.

Firmware/software client 410 (also referred to herein as client 410) includes logic for receiving firmware, software, messages, etc., and executing instructions in the received files/messages. For example, client 410 may execute an FOTA or SOTA update file transmitted via MCE 370 to UE device 110.

Caching service logic 420 may include logic for caching multicast content received by UE device 110 prior to execution or installation by client 410. Power management logic 430 may include logic for managing power/battery resources for UE device 110. For example, power management logic 430 may schedule when a processor and/or other elements on UE device 110 are put in a sleep/inactive mode and when the processor/other elements are awake/active. As an example, power management logic 430 may signal modem manager 460 when modem 470 is to wake up and be put in an enabled state to receive transmissions, such as scheduled multicast content.

Storage 440 may include one or more memory devices or databases for storing information and instructions used during operation of UE device 110. MCM-MW 450 may include software/middleware that receives data associated with a multicast transmission and interfaces with client 410 and caching service logic 420 to orchestrate the reception and caching of a multicast file/message for execution and/or installation by client 410, as described in more detail below.

Modem manager 460 may manage modem 470 with respect to signaling modem to power down or enter a "sleep" state or mode when UE device 110 is not expected to receive or transmit data and to wake up when UE device 110 is expected to receive or transmit data. The term "sleep" state/mode as used herein refers to a mode in which UE device 110 is dormant and not able to transmit or receive data. In this mode, modem 470 and other elements may be in a disabled or powered down mode to save battery resources. As described above, UE device 110 may be in a sleep mode most of the time to conserve battery resources and wake up (e.g., enable various elements, such as modem 470) when data is expected to be received or transmitted. Modem 470 may include modulator/demodulator logic to receive data that is wirelessly transmitted, demodulate the received data and forward the received data to other components of UE device 110, such as client 410, caching service logic 420, etc. Modem 470 may also include a modulator to modulate data for transmission to other devices in environment 100 via network 140.

Although FIG. 4 shows exemplary components of UE device 110, in other implementations, UE device 110 may include fewer components, different components, differently arranged components, or additional components than depicted in FIG. 4, such as one or more antennas and/or communication interfaces for transmitting and receiving data via network 140. In addition, functions described as being performed by one of the components in FIG. 4 may alternatively be performed by another one or more of the components of UE device 110.

Figure 5:
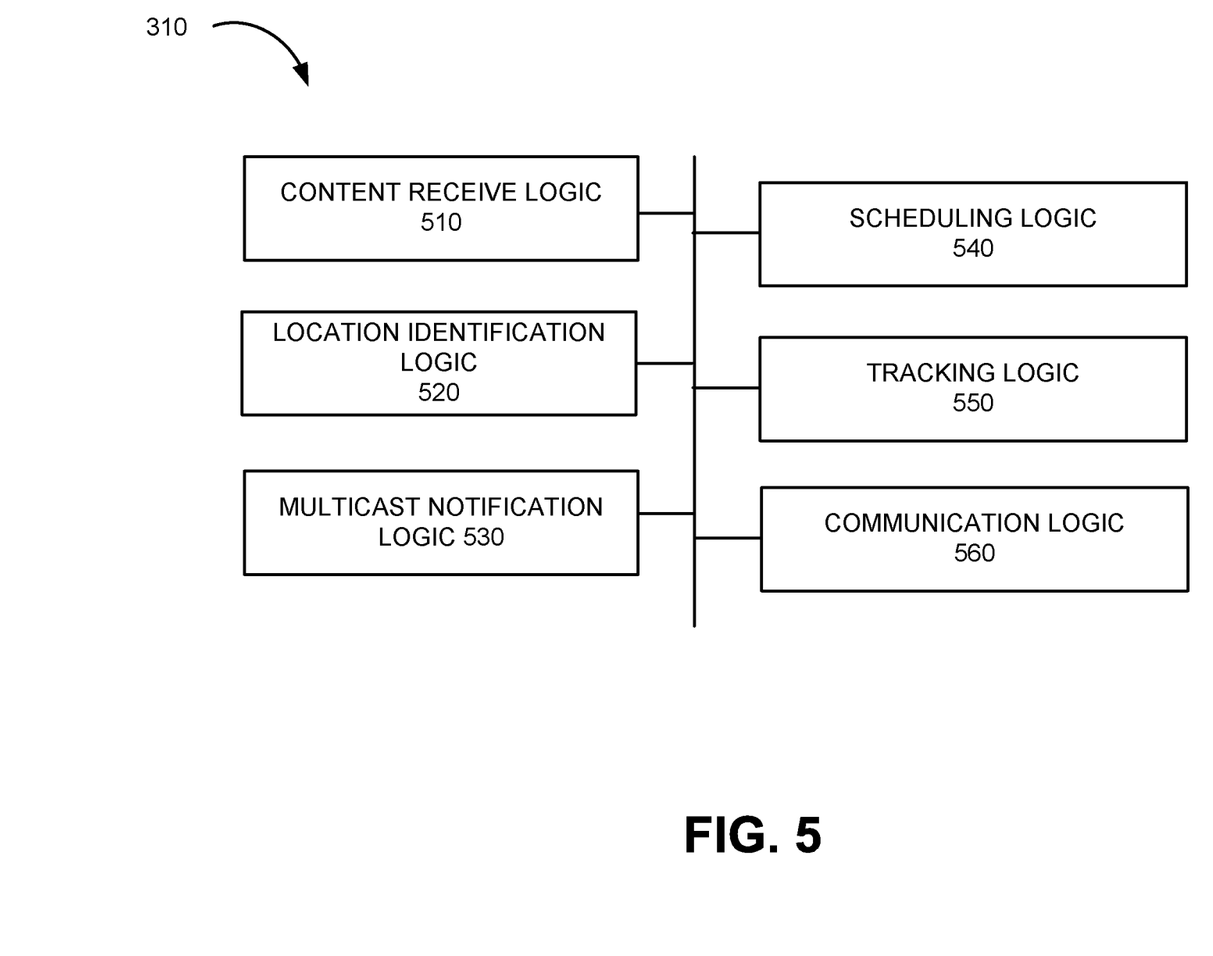
FIG. 5 illustrates an exemplary configuration of logic components included in the user equipment device management platform of FIG. 1.

FIG. 5 illustrates components implemented in UE device management platform 310 in accordance with an exemplary implementation. Referring to FIG. 5, UE device management platform 310 includes content receive logic 510, location identification logic 520, multicast notification logic 530, scheduling logic 540, tracking logic 550 and communication logic 560.

Content receive logic 510 includes logic associated with receiving content from subscribers associated with managing a large number of UE devices 110. For example, content receive logic 510 may receive an FOTA or SOTA update file associated with UE devices 110 from an OEM or other entity associated with managing UE devices 110. Location identification logic 520 may include logic associated with identifying the locations of UE devices 110 associated with a particular subscriber/entity. For example, location identification logic 520 may identify the geographical location (e.g., city, zip code, etc.) of a number of UE devices 110 for which an entity would like to broadcast content.

Multicast notification logic 530 may include logic to notify UE devices 110 of an upcoming multicast transmission. For example, multicast notification logic 530 may transmit relatively short, low overhead or lightweight paging type messages or signals to UE devices 110 that identify a time and channel information associated with an upcoming multicast transmission.

Scheduling logic 540 may include logic to schedule multicast transmissions. For example, scheduling logic 540 may receive a desired time range for a multicast from an entity/subscriber associated with managing UE devices 110. Scheduling logic 540 may identify an optimum time within the requested time range for scheduling the multicast. For example, scheduling logic 540 may take into account network conditions, expected network traffic, etc., to determine the optimum time for a multicast transmission. Scheduling logic 540 may also select a time for a multicast when UE devices 110 are expected to be awake. For example, scheduling logic 540 may store a schedule of when particular UE devices 110 associated with an entity are typically awake. Scheduling logic 540 may use this information to provide the paging type message when at least some of the UE devices 110 are expected to be awake. Scheduling logic 540 may also determine a number of times to repeat the multicast transmission to ensure that all or most of the UE devices 110 that are intended to receive the multicast are able to successfully receive the multicast content.

Tracking logic 550 includes logic to track the success/failure of a multicast transmission. For example, tracking logic 550 may determine that 2000 UE devices 110 are to receive a particular multicast and determine, based on acknowledgements from UE devices 110, that only 759 of UE devices 110 successfully received the content. Tracking logic 550 may then determine whether another multicast session is needed based on the success rate or other key performance indicators (KPIs) associated with the multicast.

Communication logic 560 may include logic associated with forwarding signals to and receiving signals from other devices in environment 100, such as UE devices 110, CDN 320, BVPS 330, CPG 340, etc. For example, communication logic 560 may transmit paging type messages to UE devices 110 via CPG 340 to allow UE devices 110 to tune to a multicast channel at the appropriate time. Communication logic 560 may also transmit multicast content to CDN 320 and/or BVPS 330, as described in detail below.

Although FIG. 5 shows exemplary components of UE device management platform 310, in other implementations, UE device management platform 310 may include fewer components, different components, differently arranged components, or additional components than depicted in FIG. 5. In addition, functions described as being performed by one of the components in FIG. 5 may alternatively be performed by another one or more of the components of UE device management platform 310.

Figure 6A:
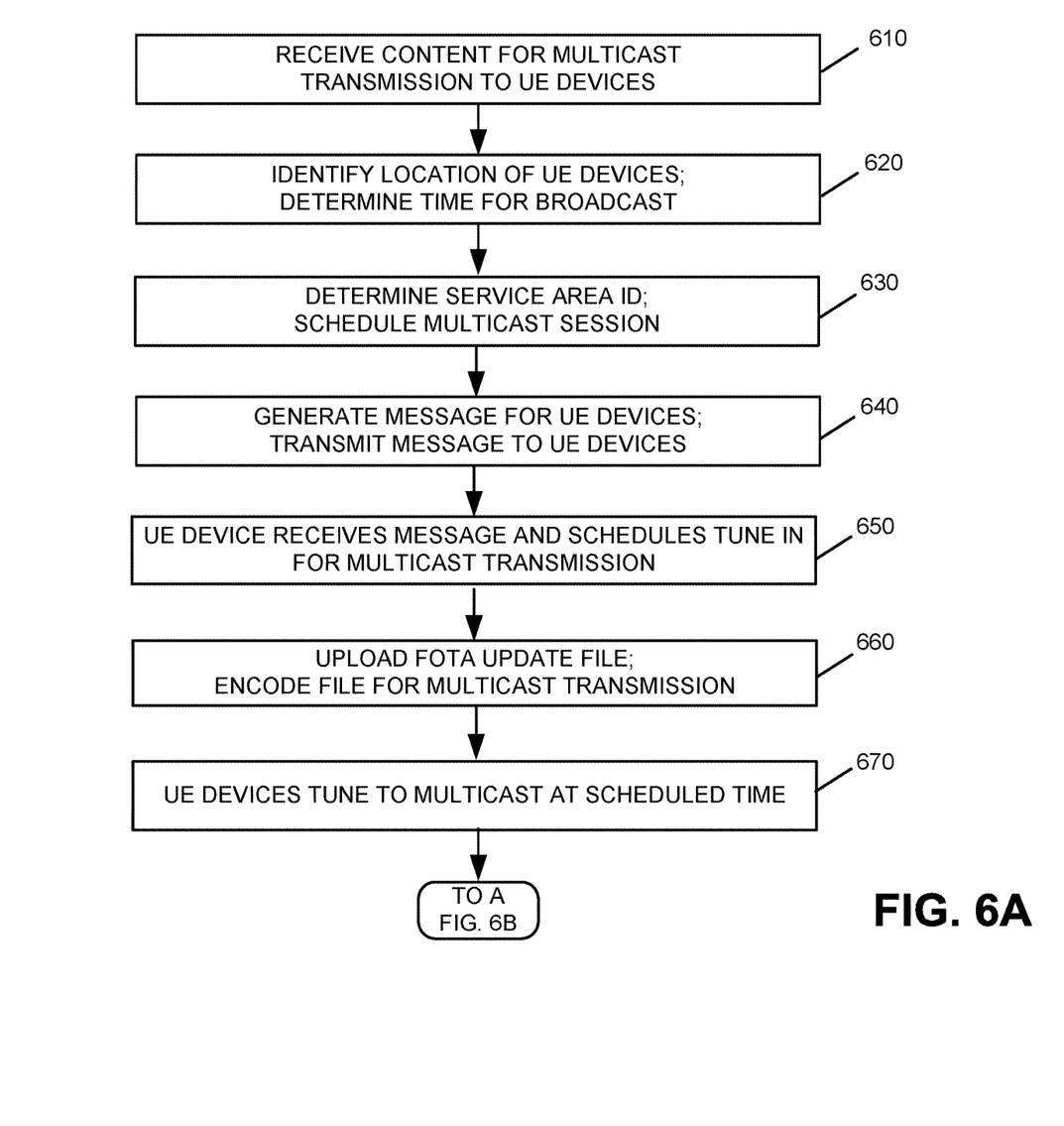
FIGS. 6A and 6B are flow diagrams illustrating exemplary processing in the environment of FIG. 3.
Figure 6B:
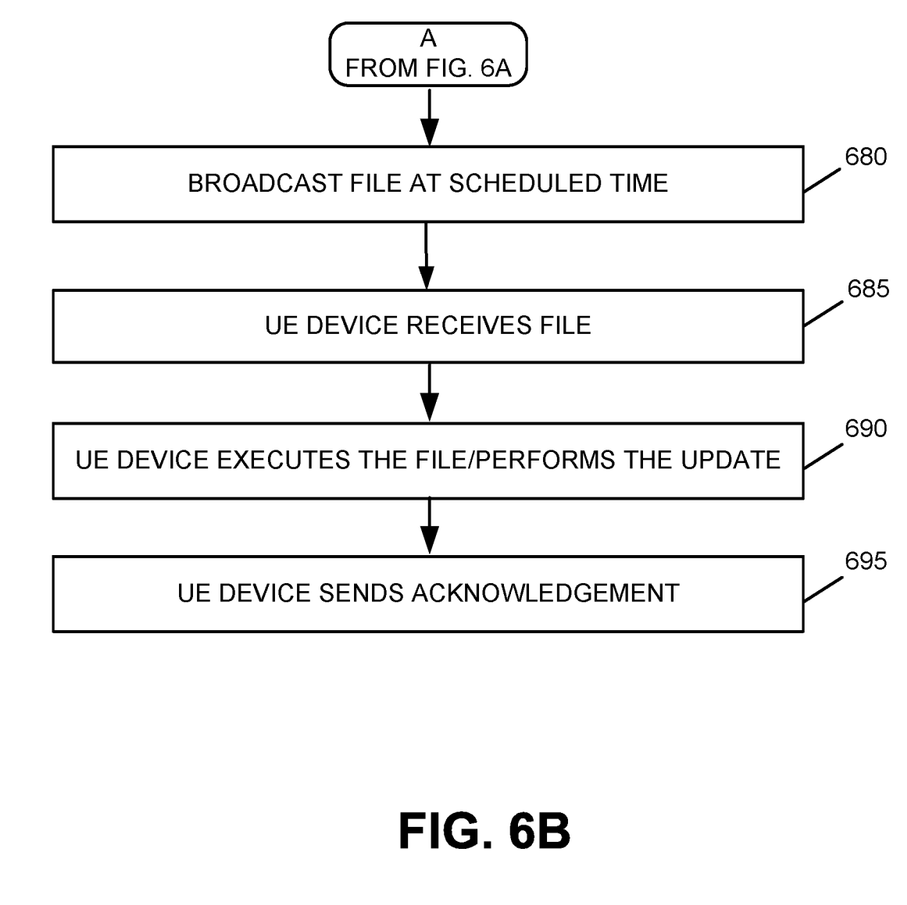
Figure 7:
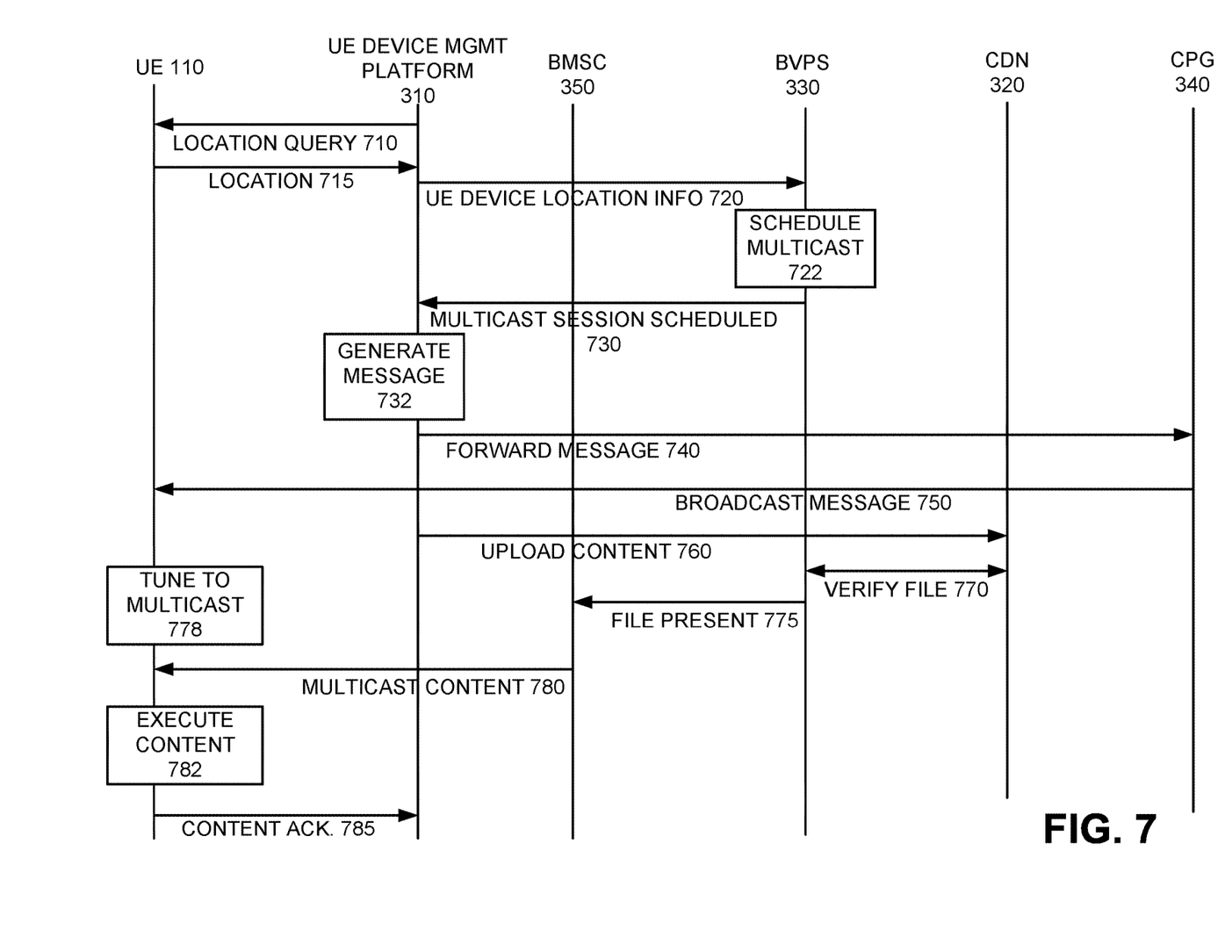
FIG. 7 is a signal flow diagram associated with the processing of FIGS. 6A and 6B.

FIGS. 6A and 6B are flow diagrams illustrating processing associated with multicast sessions in environment 100 and FIG. 7 is a signal flow diagram associated with the processing in FIGS. 6A and 6B. Processing may begin with UE device management platform 310 receiving content for multicast transmission to UE devices 110 (block 610). For example, a customer of service provider 120 that manages a large number of UE devices 110 (e.g., thousands or more IoT devices), may wish to schedule a FOTA or SOTA update for UE devices 110 in a particular geographical area, such as a city/metropolitan region (e.g., New York city area), a particular zip code, etc.

As an example, an entity managing smart parking meters or traffic lights, asset tracking devices (e.g., cameras), vehicles, smart homes, etc., may wish to provide a FOTA update to the UE devices 110 that the entity manages. In this case, the entity/customer of service provider 120 may communicate with UE device management platform 310 and provide a FOTA update file that will be multicast to the particular UE devices 110, along with information designating the location/geographical area associated with the multicast, a desired time period for the multicast (e.g., Dec. 20, 2019 between 12 AM and 6 AM), and other information associated with the multicast.

UE device management platform 310 receives the multicast content, information identifying the location of the multicast and the requested time for the multicast. UE device management platform 310 may then query the UE devices 110 associated with the customer to determine the locations of the UE devices 110 (block 620). For example, UE device management platform 310 queries UE devices 110 for the locations of the respective UE devices 110 (signal 710) and UE devices 110 provide their respective locations to UE device management platform 310 (signal 715). UE device management platform 310 may forward the location information for UE devices 110 to BVPS 330 (signal 720).

UE device management platform 310 may also determine an off peak hours/traffic time slot for the broadcast that best fits the customer's needs, such as the customer's desired time range for the multicast event (block 620). For example, based on the customer's desired time range of 12:00 AM-6:00 AM on Dec. 20, 2019 in the example above, UE device management platform 310 may select 2:00 AM as the time to multicast the content to UE devices 110. The selection may be based on a time when data traffic in network 140 is expected to be very low. In some implementations, the selected multicast time may be based on when UE devices 110 are expected to be awake. For example, if UE devices 110 are typically awake once a day from 2:00 AM to 2:15 AM for processing received messages and/or transmitting messages, UE device management platform 310 may select 2:00 AM as the time for the multicast.

BVPS 330 receives the UE device 110 location information from UE device management platform 310 and information regarding the identified time for the multicast. BVPS 330 may then determine a service area identifier (SAID) and a serving BMSC 350 associated with the SAID (block 630) and schedule the multicast (block 630; block 722). BVPS 330 may also send a message to UE device management platform 310 regarding the scheduled multicast transmission (signal 730). For example, BVPS 330 may send a confirmation message indicating the SAID and time for the scheduled multicast to UE device management platform 310.

UE device management platform 310 receives the multicast session schedule confirmation message from BVPS 330 (e.g., via an API) and generates a message to be transmitted to UE devices 110 (block 640; block 732). For example, UE device management platform 310 may generate a "paging" type message to UE devices 110 associated with the SAID. The paging message may contain information regarding a time and/or time range when UE devices 110 are to tune to the multicast session and information regarding the channel on which the multicast will be transmitted.

UE device management platform 310 may forward the paging message to CPG 340 for transmission via network 140 (signal 740). CPG 340 may then broadcast the message to UE devices 110 via, for example, one or more wireless stations 380 (e.g., eNodeBs) serving the SAID associated with the UE devices 110 that are to receive the multicast content (block 640; signal 750). In an exemplary implementation, the paging type message may be a lightweight or low overhead message transmitted in accordance with Cat-M or NB IoT frequency bands associated with UE devices 110.

UE device 110 receives the message and processes the message to prepare for the multicast session (block 650). For example, client 410 processes the paging message and forwards the message to caching service logic 420 and/or MCM-MW 450. Caching service logic 420 and/or MCM-MW 450 receives the message and schedules UE device 110 to tune in to the multicast at the scheduled time (block 650).

Client 410 may also signal power management logic 430 to wake UE device 110 at the time scheduled for the multicast or shortly before the scheduled multicast. For example, power management logic 430 may signal modem manager 460 to wake modem 470 at the scheduled time. In this manner, power management logic 430 may minimize use of battery resources associated with an update (e.g., a FOTA update) and use battery resources in an efficient manner to ensure that UE device 110 is not awake for an excessive period of time.

Concurrently with or prior to sending the paging message, and prior to the scheduled multicast event, UE device management platform 310 may also upload the information to be multicast (e.g., an FOTA update) to CDN 320, (block 660; signal 760). BVPS 330 verifies that the multicast file is present at CDN 320 prior to the scheduled multicast event (signals 770). If the multicast file is present, BVPS 330 signals the identified BMSC 350 serving the identified SAID associated with the UE devices 110 that the multicast file is present (signal 775). BVPS 330 may also provide information regarding the multicast, such as how many times the multicast file is to be broadcast.

For example, UE device management platform 310 may determine that a particular multicast file is to be broadcast in a repeated manner over a period of time to provide UE devices 110 with the best chance of receiving the file and reduce the possibility that a number of UE devices 110 do not receive the file. For example, depending on the size of the file and the bit rate/speed at which the file is transmitted, UE device management platform 310 may determine that the broadcast is to be repeated a number of times over a certain period of time. As an example, if the multicast file is a 10 Megabyte (Mb) file and the transmission speed is 1 Mb per second, BMSC 350 may repeat the multicast transmission every 10-15 seconds for a predetermined period of time (e.g., 5 minutes).

In this manner, if one or more UE devices 110 do not receive the file during the first broadcast transmission, those UE devices 110 may receive the file during a subsequent broadcast.

At the scheduled time, UE devices 110 wake up and tune to the multicast channel (block 670, block 778). For example, power management logic 430 signals modem manager 460 to wake up modem 470 and tune to the multicast. At the scheduled time, BMSC 350 broadcasts the file to wireless stations 380 (e.g., eNodeBs) via, for example, MCE 370, in the identified multicast service area (block 680, signal 780). BMSC 350 may also repeat the broadcast multiple times and/or for a predetermined period of time, as described above, to ensure that all of the UE devices 110 receive the file.

Assume that UE device 110 receives the file (block 685). UE device 110 may then execute the file (block 690; block 782). For example, if the file is an FOTA update, client 410 executes the file and updates the firmware of UE device 110 (block 690). UE device 110 may also signal UE device management platform 310 upon successful reception of the multicast file (block 695; signal 785). UE device management platform 310 may then determine whether another multicast session is to be scheduled.

For example, as described above, tracking logic 550 may determine that not all of UE devices 110 or less than a predetermined number/percentage of UE devices 110 received the multicast file. In this case, tracking logic 550 may determine that UE device management platform 310 is to schedule another multicast session to retransmit the multicast content. The additional multicast session may be scheduled based on expected traffic in network 140, expected sleep times for UE devices 110 and/or other factors. In each case, UE device management platform 310 may ensure that all UE devices 110 successfully receive the file and/or keep track of those UE devices 110 that have not received the file.

Implementations described herein include provisioning multicast services to UE devices in an efficient manner without requiring a service provider to unicast content to UE devices. In addition, implementations described herein provide a message or signal to the UE devices 110 prior to the multicast with information identifying the time for the multicast. This enables the UE devices 110 to exit a sleep mode and wake up at the appropriate time to receive the multicast content, thereby allow the UE devices 110 to conserve battery resources.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been mainly described above with respect to multicasting an update, such as an FOTA or SOTA update, to UE devices 110. In other implementations, other types of content may be multicasted to UE devices 110, such as a patch to fix a particular software bug, a schedule indicating when UE devices 110 are to sleep/wake up, etc. Further, implementations have been described above with respect to UE devices 110 being IoT devices, such as NB-IoT devices, Cat-M IoT devices, etc. However, in other implementations, UE devices 110 may include any type of mobile or fixed device with communication capabilities.

Further, while series of acts have been described with respect to FIGS. 6A and 6B and signal flows with respect to FIG. 7, the order of the acts and signal flows may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, by at least one network device associated with providing multicast services, content for multicasting;
   identifying, by the at least one network device, a plurality of user equipment (UE) devices to receive the content;
   identifying at least one of a geographical or service area associated with the identified plurality of UE devices;
   identifying, by the at least one network device, a time when at least some of the plurality of UE devices will be awake;
   determining, by the at least one network device, a scheduled time for a multicast transmission of the content;
   transmitting, by the at least one network device and at the identified time, a message to the plurality of UE devices, wherein the message indicates the scheduled time; and
   initiating, by the at least one network device, the multicast transmission of the content at the scheduled time.

2. The method of claim 1, wherein the at least one network device comprises a device management platform and a broadcast system, the method further comprising:
   providing, by the device management platform, the scheduled time to the broadcast system via an application programming interface.

3. The method of claim 1, further comprising:
   receiving, by the at least one network device, a message from at least some of the plurality of UE devices, wherein the message indicates that the multicast content was successfully received.

4. The method of claim 3, further comprising:
    determining, by the at least one device, whether to schedule another multicast session based on a number of received messages indicating that the multicast content was successfully received.

5. The method of claim 1, wherein the content comprises at least one of a firmware update or a software update for the plurality of UE devices, and
    wherein the identifying the time when at least some of the plurality of UE devices will be awake comprises:
    accessing, by the at least one network device, a schedule to identify the time.

6. The method of claim 1, wherein the receiving content comprises receiving content from an entity associated with managing the plurality of UE devices, and wherein the content is received by the at least one network device via an application programming interface.

7. The method of claim 1, wherein the plurality of UE devices comprise Internet of Things (IoT) devices and the message identifies a wireless channel via which the plurality of IoT devices are to obtain the content.

8. The method of claim 1, further comprising:
    repeating the multicast transmission a plurality of times.

9. The method of claim 1, further comprising:
    providing, to the plurality of UE devices, software configured to perform power management at each of the respective UE devices, wherein the software is configured to signal at least a modem on the UE device to awake prior to the scheduled multicast transmission.

10. A system, comprising:
    at least one device configured to:
        receive content for multicasting,
        identify a plurality of user equipment (UE) devices to receive the content,
        identify at least one of a geographical or service area associated with the identified plurality of UE devices,
        identify a time when at least some of the plurality of UE devices will be awake,
        determine a scheduled time for a multicast transmission of the content,
        transmit, at the identified time, a message to the plurality of UE devices, wherein the message indicates the scheduled time, and
        initiate the multicast transmission of the content at the scheduled time.

11. The system of claim 10, wherein the at least one device comprises a device management platform and a broadcast system, wherein
    the device management platform is configured to provide the scheduled time to the broadcast system via an application programming interface.

12. The system of claim 10, wherein when identifying the time when at least some of the plurality of UE devices will be awake comprises:
    accessing, by the at least one device, a schedule to identify the time, and wherein the at least one device is further configured to:
    receive a message from at least some of the plurality of UE devices, wherein the message indicates that the multicast content was successfully received.

13. The system of claim 12, wherein the at least one device is further configured to:
    determine whether to schedule another multicast session based on a number of received messages indicating that the multicast content was successfully received.

14. The system of claim 10, wherein the content comprises at least one of a firmware update or a software update for the plurality of UE devices and wherein the at least one device is further configured to:
    repeat the multicast transmission a plurality of times.

15. The system of claim 10, wherein the plurality of UE devices comprise Internet of Things (IoT) devices and when transmitting the message, the at least one device is configured to:
    include, in the message, information identifying a wireless channel via which the plurality of IoT devices are to obtain the content.

16. The system of claim 10, wherein the at least one device is further configured to:
    provide, to the plurality of UE devices, software configured to perform power management at each of the respective UE devices, wherein the software is configured to signal at least a modem on the UE device to awake prior to the scheduled multicast transmission.

17. A non-transitory computer-readable medium having stored thereon sequences of instructions which, when executed by at least one processor included in a network device, cause the at least one processor to:
    receive content for multicasting;
    identify a plurality of user equipment (UE) devices to receive the content;
    identify at least one of a geographical or service area associated with the identified plurality of UE devices;
    identify a time when at least some of the plurality of UE devices will be awake;
    determine a scheduled time for a multicast transmission of the content;
    transmit, at the identified time, a message to the plurality of UE devices, wherein the message indicates the scheduled time; and
    initiate the multicast transmission of the content at the scheduled time.

18. The non-transitory computer-readable medium of claim 17, wherein the instructions further cause the at least one processor to:
    determine whether to schedule another multicast session based on a number of received messages indicating that the content was successfully received.

19. The non-transitory computer-readable medium of claim 17, wherein the plurality of UE devices comprise Internet of Things (IoT) devices and when transmitting the message, the instructions further cause the at least one processor to:
    include, in the message, information identifying a wireless channel via which the plurality of IoT devices are to obtain the content.

20. The non-transitory computer-readable medium of claim 17, wherein the content comprises at least one of a firmware update or a software update for the plurality of UE devices, and the instructions further cause the at least one processor to:
    include, in the message, information identifying a wireless channel via which the plurality of IoT devices are to obtain the content.

* * * * *